United States Patent
Ruppert

(10) Patent No.: US 11,453,561 B2
(45) Date of Patent: Sep. 27, 2022

(54) RECEIVING ELEMENT, ARRANGEMENT AND METHOD

(71) Applicant: Phoenix Contact GmbH & Co. KG, Blomberg (DE)

(72) Inventor: Jens Ruppert, Steinheim (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 288 days.

(21) Appl. No.: 16/310,831

(22) PCT Filed: Jun. 13, 2017

(86) PCT No.: PCT/EP2017/064343
§ 371 (c)(1),
(2) Date: Dec. 18, 2018

(87) PCT Pub. No.: WO2018/001714
PCT Pub. Date: Jan. 4, 2018

(65) Prior Publication Data
US 2020/0307923 A1    Oct. 1, 2020

(30) Foreign Application Priority Data

Jul. 1, 2016 (LU) .......................................... 93137

(51) Int. Cl.
*B65G 47/90* (2006.01)
*H01R 43/00* (2006.01)
*H01R 9/26* (2006.01)

(52) U.S. Cl.
CPC ............. *B65G 47/90* (2013.01); *H01R 43/00* (2013.01); *H01R 9/26* (2013.01)

(58) Field of Classification Search
None
See application file for complete search history.

(56) References Cited

U.S. PATENT DOCUMENTS

| | | | | |
|---|---|---|---|---|
| 5,119,934 A | * | 6/1992 | Karasawa | H05K 13/0084 206/714 |
| 5,809,639 A | * | 9/1998 | Alvite | H05K 13/021 29/740 |
| 6,381,821 B1 | * | 5/2002 | Panyon, Jr. | B05B 1/202 137/318 |
| 8,535,084 B2 | | 9/2013 | Koellmann | |

FOREIGN PATENT DOCUMENTS

| | | |
|---|---|---|
| CN | 103770110 A | 5/2014 |
| CN | 205016584 U | 2/2016 |
| CN | 105690363 A | 6/2016 |
| DE | 19622718 A1 | 12/1996 |
| DE | 102009017999 A1 | 5/2010 |
| DE | 102011054791 A1 | 4/2013 |
| JP | H 09216715 A | 8/1997 |
| JP | 2000062890 A | 2/2000 |

(Continued)

*Primary Examiner* — Ronald P Jarrett
(74) *Attorney, Agent, or Firm* — Leydig, Voit & Mayer, Ltd.

(57) ABSTRACT

A receiving element for receiving and transporting a component includes: a main body. A recess in the form of an indentation into which the component is insertable is formed in the main body. In an embodiment, the recess has a shape which is adapted to a contour of the component.

7 Claims, 4 Drawing Sheets

(56) References Cited

FOREIGN PATENT DOCUMENTS

| | | |
|---|---|---|
| KR | 19970001953 B1 | 1/1997 |
| KR | 0123016 Y1 | 12/1998 |
| KR | 20110076897 A | 7/2011 |
| WO | WO 2010057769 A1 | 5/2010 |
| WO | WO 2016103334 A1 | 6/2016 |

* cited by examiner

RECEIVING ELEMENT, ARRANGEMENT AND METHOD

CROSS-REFERENCE TO PRIOR APPLICATIONS

This application is a U.S. National Phase application under 35 U.S.C. § 371 of International Application No. PCT/EP2017/064343, filed on Jun. 13, 2017, and claims benefit to Luxembourg Patent Application No. LU93137, filed on Jul. 1, 2016. The International Application was published in German on Jan. 4, 2018 as WO 2018/001714 under PCT Article 21(2).

FIELD

The invention relates to a receiving element for receiving and transporting a component, in particular an electrical component, such as a terminal block. The invention also relates to an arrangement and to a method for automated handling of components, in particular electrical components.

BACKGROUND

DE 10 2009 017 999 A1 discloses an apparatus and a method for automated assembly of electrical components such as terminal blocks, on a mounting base, such as a support rail. The apparatus comprises a pincer-like gripper that can be moved in space by means of a mounting robot such that the electrical components can be gripped one after the other by means of the gripper and placed on the mounting base. In order to be able to use the gripper to grip electrical components having a wide range of designs, the gripper and the electrical components are provided with corresponding receiving and mounting contours that interact in a form-fitting and/or force-locking manner and can have a wide range of designs. The corresponding receiving contours can be formed as projections which can be plugged together or into one another on the gripper or on the housing of the electrical components and as recesses in the housing of the electrical components or the gripper which correspond to the projections. The projections may be formed as pins and the recesses as corresponding through-holes, blind holes or grooves such that the pins and the through-holes, blind holes or grooves can be brought into engagement with one another. This embodiment is disadvantageous in that only specially designed electrical components can be handled, and therefore said apparatus and said method does not allow any flexibility. In addition, grippers of this kind can damage the electrical components to be received, for example in the form of visible impressions on the components.

SUMMARY

In an embodiment, the present invention provides a receiving element for receiving and transporting a component, comprising: a main body, wherein the main body includes a recess in the form of an indentation into which the component is insertable.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
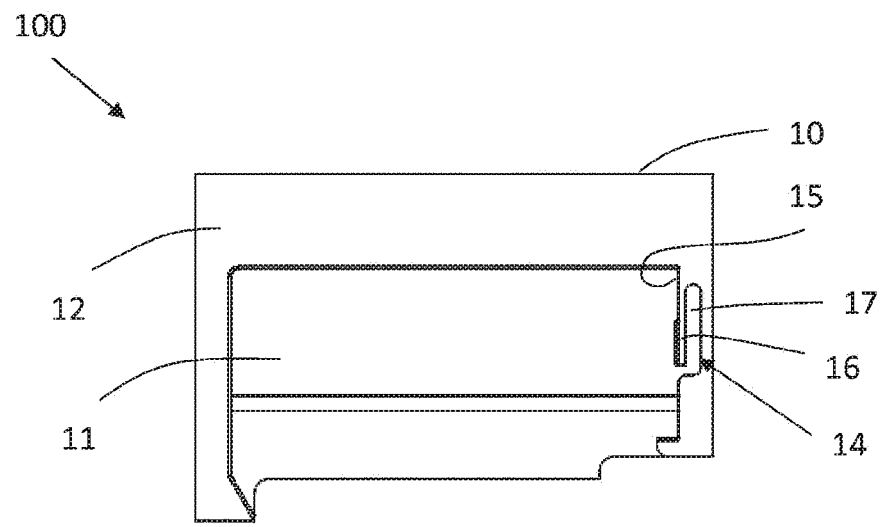
FIG. 1 is a schematic view of a receiving element according to the invention.

An aspect of the present invention provides a receiving element, an arrangement and a method by means of which secure receipt and safe transport of electrical components can be ensured at the same time as increased flexibility in terms of the selection of the electrical components to be received and transported.

The receiving element according to the invention comprises a main body, a recess in the form of an indentation into which the component can be inserted being formed in the main body.

The receiving element according to the invention is substantially formed by a main body which is preferably box-like or block-shaped and thus has a rectangular outer contour. A recess in the form of an indentation is made in said main body and is used to be able to receive a component, in particular an electrical component. The recess is preferably formed in the main body such that the main body can enclose and support an electrical component received in the recess on at least three of its transverse lateral faces and one of its longitudinal lateral faces. As a result, particularly secure receipt and particularly safe transport of electrical components is possible by means of the receiving element. Due to the possibility of supporting a received electrical component on a plurality of its lateral faces within the recess, the electrical component is in particular prevented from tilting or even falling out of the receiving element when said electrical component is transported. The recess is not in the form of an aperture in the main body, but rather in the form of an indentation, such that a rear wall is formed in the region of the recess, against which wall a longitudinal lateral face of the electrical component can rest when inserted. The receiving element is therefore not designed to be pincer-like; rather, the receiving element is formed by an integrally formed main body in which a receiving contour is introduced in the form of the recess. The electrical components themselves do not have to be designed in any particular manner in order to be able to be received and transported by the receiving element, and therefore any type of electrical component can be handled in an automated manner by the receiving elements. This makes it possible to achieve increased flexibility. In addition, the insertion of an electrical component into the receiving element instead of in particular pincer-like gripping makes it possible to avoid damage to the electrical component to be received. Electrical components may in particular be terminal blocks, and the receiving element can then also be referred to as a terminal block receiving element.

The recess preferably has a shape which is adapted to the contour of the component. The contour of the recess can be adapted precisely to the outer contour of the electrical component to be received. The shape of the recess is preferably a negative contour of the electrical component to be received. A receiving element can thus be individually provided for each different outer contour of an electrical component, meaning that only the receiving element is adapted to the electrical component to be received, but not the electrical component itself.

In order to be able to achieve an adaptation of the shape of the recess in the main body as simply, as quickly and as cost-efficiently as possible, it is preferable for the main body to be produced in a sintering or 3D-printing process. This allows the contour of the recess to be individually adapted for each main body or receiving element to be individually produced. The recess can be formed in the main body directly during the sintering or 3D-printing process, so that even complex contours of the recess can be introduced into the main body in a simple manner. Additionally or alternatively, it is also possible for the recess to be made in the main body by milling the main body. The main body is preferably made of plastics material.

In order to increase the stability of the receipt of the component in the receiving element, it is preferable for a resilient fixing region to be formed in the region of the recess. Secure clamping of the electrical component within the recess can be achieved by means of the fixing region. Two or more fixing regions of this kind may be formed in the region of the recess, it being possible for the fixing regions to have the same or a different design, and thus to also be able to fulfill different functions.

The fixing region is preferably in the form of a spring arm. The spring arm may be arranged on an inner surface of the main body that delimits the recess. By means of a spring arm, it is possible to fix an electrical component within the recess in a simple and easily removable manner.

The fixing region is preferably integral with the main body, and therefore no component in addition to the main body has to be provided in order to be able to achieve fixing. If the main body is produced in a sintering and/or 3D-printing process, the fixing region can be formed as early as during the production of the main body, it being possible for the shape and design of the fixing region to be individually adapted to the requirements, in particular to the particular contour of the electrical component to be received, without significant effort.

Furthermore, a receiving region for a transport apparatus is preferably formed on the main body. Said receiving region makes it possible for the receiving element to be gripped by the transport apparatus and to be transported to any desired position. The receiving region is preferably designed to be spaced apart from the recess on the main body. The receiving region is preferably formed on a lateral face of the main body that is opposite the recess. For example, the receiving region can be formed by one or more attachments that are molded onto the main body and can be grasped by the transport apparatus, and/or by one or more openings made in the base body in which the transport apparatus can engage.

The invention also provides an arrangement for automated handling of components. The arrangement comprises a magazine in which a plurality of components can be mounted, a slider which is slidably guided in the magazine, a receiving element which is designed and developed as described above and can be positioned at one end of the magazine, and a transport apparatus for transporting the receiving element towards the magazine and away from the magazine.

The invention further provides a method for automated handling of components, in which a transport apparatus transports a receiving element which is designed and developed as described above to a magazine and positions said element at one end of the magazine, a slider which is slidably guided in the magazine slides the components mounted in the magazine towards the receiving element in such a way that one of the components is inserted into the recess, in the form of an indentation, in the main body of the receiving element, and a transport apparatus receives the receiving element together with the inserted component and transports said element away from the magazine.

The arrangement and the method are used to be able to automatically snap components, in particular in the form of electrical components such as terminal blocks, onto a support rail. The components to be processed are initially mounted in a magazine in which the components are preferably arranged one behind the other in a row. The components mounted in the magazine can have different designs or different contours. The components are preferably slidably mounted inside the magazine such that a slider that is slidably guided in the magazine can slide the components to a preferably open end of the magazine. A receiving element of which the contour of the recess in the main body is adapted to the outer contour of the component to be received is positioned at said open end by means of the transport apparatus. On account of a sliding movement of the slider towards the receiving element positioned at the open end, all the components mounted in the magazine are slid towards the open end of the magazine, the component positioned closest to the open end being inserted or pushed into the receiving element, in particular into the recess in the main body of the receiving element, by means of the slider such that the component is securely held in the recess, in particular securely fixed or in a snap-fit in the recess. By means of the transport apparatus, the receiving element together with the component received therein can subsequently be moved away from the magazine and, for example, moved towards a support rail in order to snap the received component onto said rail. This process can be repeated until all the components are removed from the magazine by means of a receiving element in each case. In each process, the receiving element can be individually selected according to the shape or contour of the current component to be received and can be moved towards the magazine by the transport apparatus. As a result, components having different shapes can be handled in an automated manner in the arrangement according to the invention, and therefore the arrangement according to the invention and the method according to the invention are highly flexible in terms of the selection of the components to be received and transported.

Figure 2:
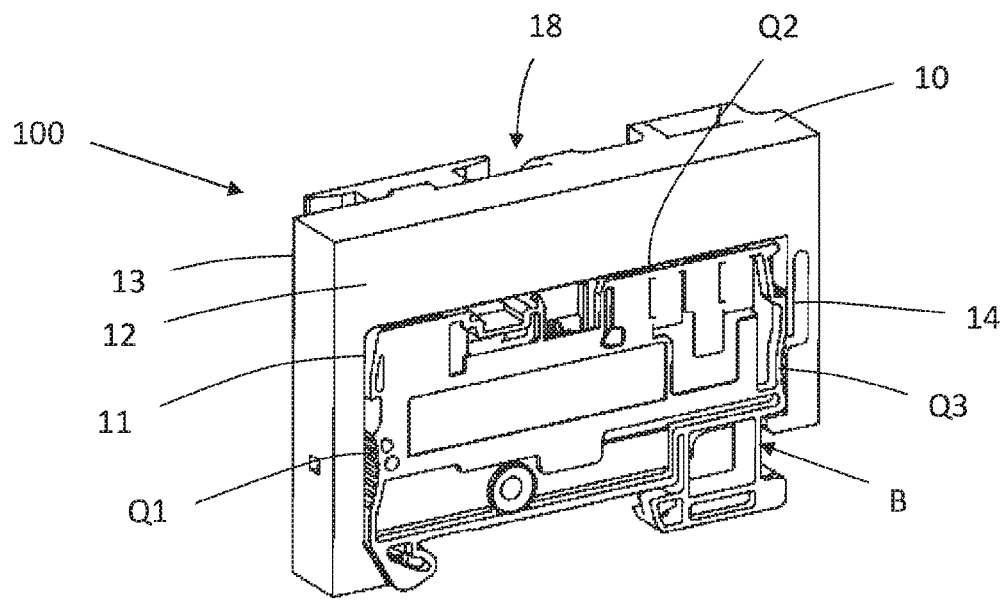
FIG. 2 is a schematic view of the receiving element shown in FIG. 1 with a component received therein.

FIG. 1 shows a receiving element 100 for receiving and transporting a component B as shown in FIG. 2, the component B in this case being an electrical component. In each of the embodiments shown here, the electrical components B are terminal blocks which can have different shapes.

The receiving element 100 comprises a main body 10 of which the outer contour is substantially rectangular and thus box-like or block-shaped. A recess 11 in the form of an indentation into which the electrical component B can be inserted is made in the main body 10. The recess 11 is formed on a first longitudinal lateral face 12 of the main body 10 such that the electrical component B can be inserted laterally into the main body 10. By contrast, a second longitudinal lateral face 13 of the main body 10, which face is opposite the first longitudinal lateral face 12, is closed and forms a rear wall and thus a support surface for the electrical component B inserted into the recess 11 such that the inserted electrical component B can rest against said second longitudinal lateral face 13, and in particular can lie flat. The recess 11 is formed in the main body 10 such that the main body 10 can enclose and support an electrical component B received in the recess 11 on at least three of its transverse lateral faces Q1, Q2, Q3 and one of its longitudinal lateral faces. Said longitudinal lateral face of the electrical component B then rests against the second longitudinal lateral face 13 of the main body 10.

The recess 11 has a shape which is adapted to the contour of the electrical component B such that the electrical component B can be received in the recess 11, and thus in the receiving element 100, in a substantially accurately fitting manner, as can be seen in FIG. 2.

Figure 4:
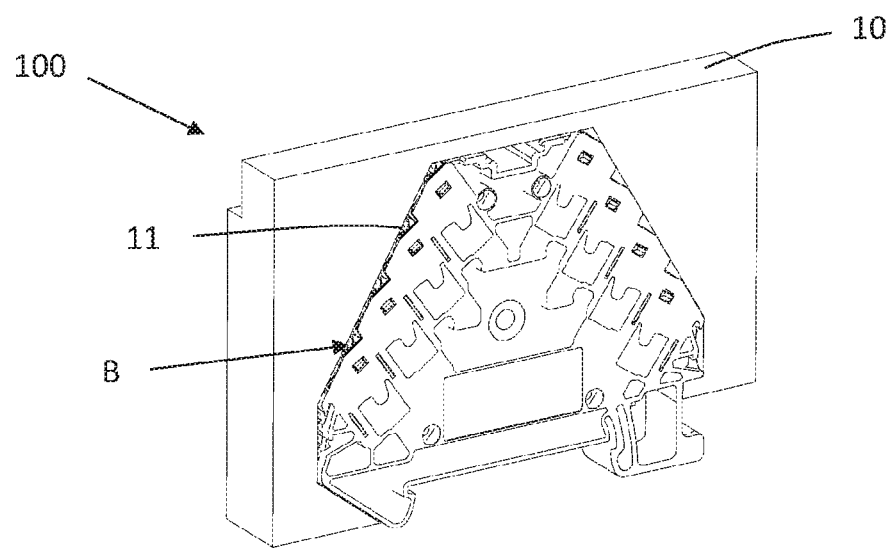
FIG. 4 is another schematic view of a receiving element according to the invention with a component received therein, FIG. 5 schematically shows a rear view of a receiving element shown in FIG. 1 together with a transport apparatus.

In order to be able to achieve such an accurate fit of the electrical component B in the receiving element 100, the main body 10 of the receiving element 100 is produced in a sintering or 3D-printing process. During production of the receiving element 100 or of the main body 10 of the receiving element 100, the main body 10 and in particular the shape of the recess 11 in the main body 10 can thus be individually designed for each different shape of the electrical component B. A receiving element 100 can thus be produced quickly and inexpensively, with high precision, for each type or shape of an electrical component B. In the embodiment shown in FIGS. 1 and 2, the electrical component B has a rectangular contour, and therefore the recess 11 also has a rectangular contour. In the embodiment shown in FIG. 4, the electrical component B has a trapezoidal contour, and therefore the recess 11 also has a trapezoidal contour.

Figure 3:
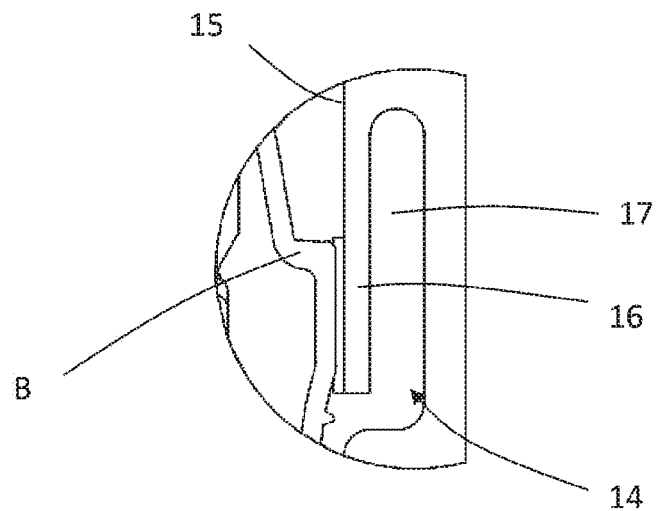
FIG. 3 is a schematic view of a detail of a fixing region of the receiving element shown in FIG. 1.

In order to increase the stability of the fixing of the electrical component B received in a receiving element 100, a resilient fixing region 14 is formed in the region of the recess 11 in the embodiment shown in FIGS. 1 and 2. FIG. 3 shows a detail of said resilient region 14.

The resilient fixing region 14 makes it possible to securely clamp the electrical component B in the recess 11. The fixing region 14 is formed on a wall 15 of the main body 10, which wall surrounds the recess 11 at least in part. In the embodiment shown here, the fixing region 14 is in the form of a spring arm 16 which presses resiliently against the transverse face Q3 of the inserted electrical component B. In order to achieve the spring action of the spring arm 16, an undercut 17 is formed in the region of the spring arm 16 on the wall 15. The fixing region 14 also makes it possible to remove the electrical component B from the recess 11 by the spring arm 16 being pivoted away from the electrical component B and the electrical component B thus being exposed on its lateral face Q3.

The fixing region 14 is integral with the main body 10, in particular the wall 15 of the main body 10, such that the fixing region 14 can be formed directly during the production of the main body 10, in particular during the sintering or 3D-printing process.

Figure 5:
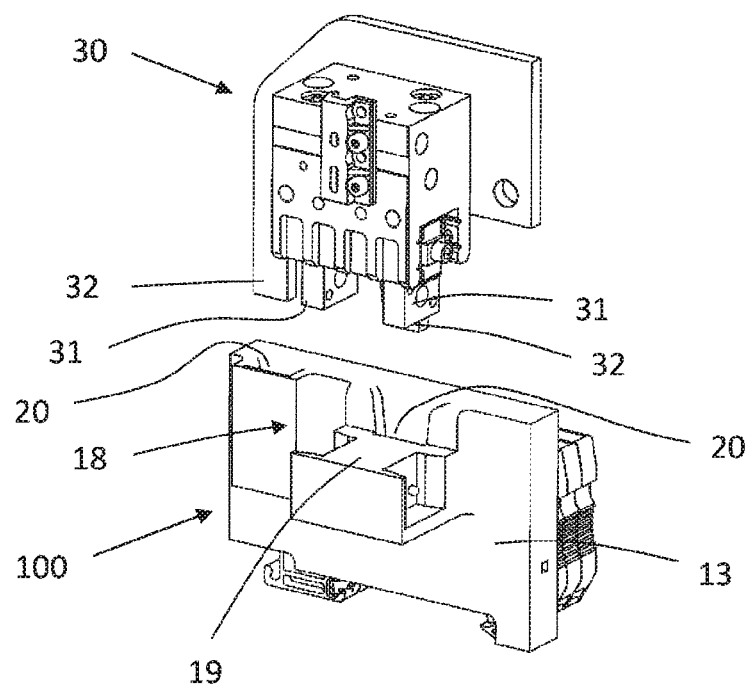

In order for a transport apparatus 30, as shown for example in FIG. 5, to be able to grip the receiving element 10, a receiving region 18 for the transport apparatus 30 is formed on the main body 10 of the receiving element 100. The receiving region 18 is formed on the second longitudinal lateral face 13 of the main body 10, and thus opposite to the recess 11 in the main body 10. The receiving region 18 in the embodiment shown here is formed by a block-shaped attachment 19 which is molded onto the main body 10 and can be grasped by the transport apparatus 30 by means of clamping jaws 31 formed on the transport apparatus 30, and by two openings 20 made in the longitudinal lateral face 13 of the main body 10, in each of which openings a ridge-like extension 32 of the transport apparatus 30 can engage.

Figure 6A:
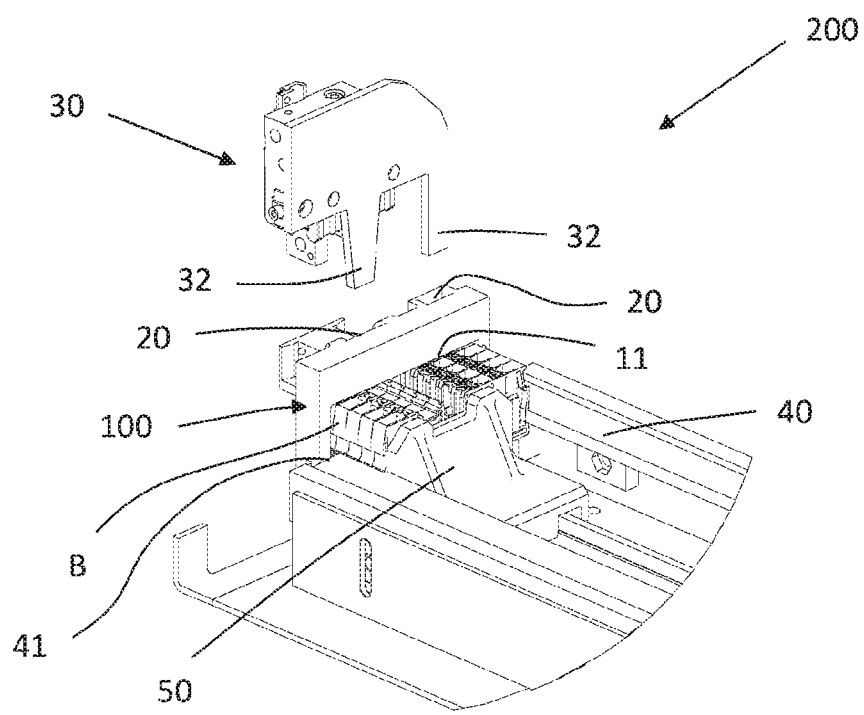
FIG. 6a-c are schematic views of an arrangement and of a sequence of the method for automated handling of components according to the invention.
Figure 6B:
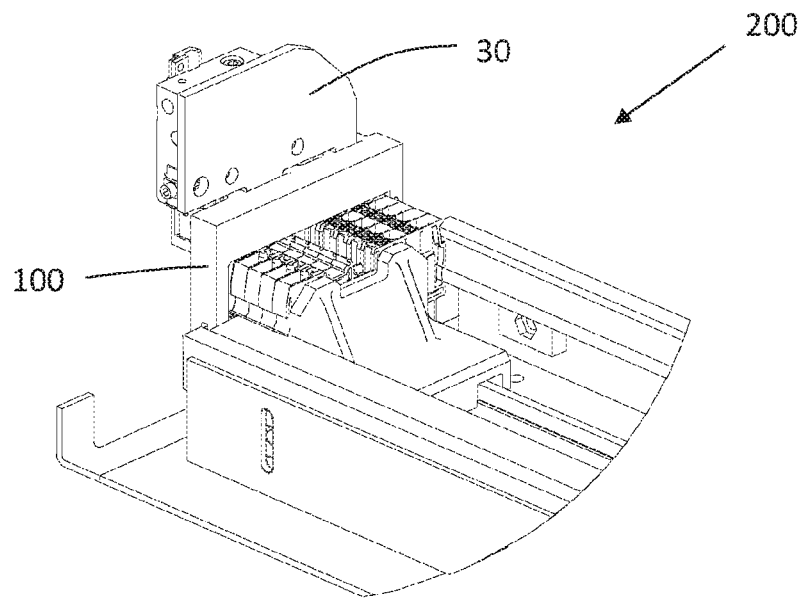
Figure 6C:
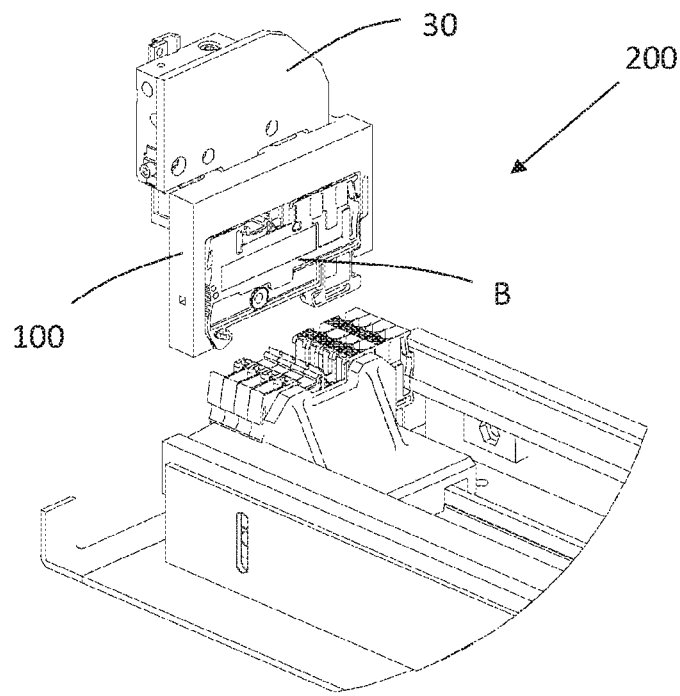

FIG. 6*a-c* show an arrangement 200 for automated handling of electrical components B and a method sequence for an arrangement 200 of this kind.

The arrangement 200 comprises a magazine 40 in which a plurality of electrical components B are arranged one behind the other in a row. By means of the receiving element 100, the electrical components B can be individually removed from the magazine 40 and transported to another station, for example a station at which the electrical components B are snapped onto support rails.

The arrangement 200 further comprises a slider 50 which is slidably guided in the magazine 40 in order to move, in particular to slide, the electrical components B inside the magazine 40. The slider 50 that is slidably guided in the magazine 40 can slide the electrical components B to an open end 41 of the magazine 40. One of the receiving elements 100 of which the contour of the recess 11 in the main body 10 is adapted to the outer contour of the exact component B to be received is positioned at said open end 41 by means of the transport apparatus 30 of the arrangement 200, as shown in FIG. 6*a*.

On account of a sliding movement of the slider 50 towards the receiving element 100 positioned at the open end 41, all the components B mounted in the magazine 40 are slid towards the open end 41 of the magazine 40, the electrical component B positioned closest to the open end 41 being inserted or pushed into the receiving element 100 in the process, in particular into the recess 11 in the main body 10 of the receiving element 100, such that said electrical component B is securely held in the recess 11, in particular securely fixed or in a snap-fit in the recess 11.

By means of the transport apparatus 30, the receiving element 100 together with the electrical component B received therein can subsequently be moved away from the magazine 40 and, for example, moved towards a support rail in order to snap the received electrical component B onto said rail. This process can be repeated until all the electrical components B are removed from the magazine 40 by means of a receiving element 100 in each case.

FIG. 6*b* shows a process in which the transport apparatus 30 engages the receiving element 100 positioned at the open end 41 of the magazine 40, and FIG. 6*c* shows how the transport apparatus 30 lifts the receiving element 100 together with the electrical component B received therein and transports said element away from the magazine.

In each process, the receiving element 100 is individually selected according to the shape or contour of the current electrical component B to be received and can be moved towards the magazine 40 by the transport apparatus 30. As a result, electrical components B having different shapes can be handled in an automated manner in the arrangement 200 according to the invention.

The receiving elements 100 differ only in terms of the shape of the recess 11, which is adapted to the contour of the electrical component B to be received. By contrast, with respect to the outer contour of the main body 10 or of the receiving element 100, all the receiving elements 100 are of identical construction, and therefore all the receiving elements 100 can be received and transported by one and the same transport apparatus 30.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Receiving element 100
Arrangement 200
Main body 10
Recess 11
First longitudinal lateral face 12
Second longitudinal lateral face 13
Fixing region 14
Wall 15
Spring arm 16
Undercut 17
Receiving region 18
Attachment 19
Opening 20
Transport apparatus 30
Clamping jaw 31
Ridge-like extension 32
Magazine 40
End 41
Slider 50
Component B
Transverse lateral face Q1
Transverse lateral face Q2
Transverse lateral face Q3

The invention claimed is:

1. A receiving element for receiving and transporting a component, comprising:
    an integrally formed main body including a recess comprising an indentation into which the component is insertable, the main body comprising at least one wall; and
    a resilient fixing region formed in a region of the recess and disposed opposite the at least one wall,
    wherein the fixing region comprises only a single spring arm configured to press resiliently against the component upon insertion of the component into the recess so as to fix the component between the single spring arm and the at least one wall,
    wherein the recess has a shape which is configured to a contour of the component.

2. The receiving element according to claim 1, wherein the main body is produced in a sintering or 3D-printing process.

3. The receiving element according to claim 1, wherein the fixing region is integral with the main body.

4. The receiving element according to claim 1, further comprising a receiving region for a transport apparatus, the receiving region being formed on the main body.

5. An arrangement for automated handling of components, comprising:
    a magazine in which a plurality of components are mountable;
    a slider which is slidably guided in the magazine;
    the receiving element according to claim 1, the receiving element being configured to be positioned at one end of the magazine; and
    a transport apparatus configured to transport the receiving element towards the magazine and away from the magazine.

6. A method for automated handling of components, comprising:
    transporting, using a transport apparatus, the receiving element according to claim 1 to a magazine and positioning the receiving element at one end of the magazine;
    sliding, using a slider which is slidably guided in the magazine, the components mounted in the magazine towards the receiving element such that one of the components is inserted into the recess, in the form of an indentation, in the main body of the receiving element; and
    receiving, using transport apparatus, the receiving element together with the inserted component and transporting the receiving element away from the magazine.

7. An arrangement, comprising:
    a receiving element having an integrally formed main body including a recess, the main body comprising at least one wall, the receiving element comprising a resilient fixing region formed in a region of the recess and disposed opposite the at least one wall, the fixing region comprising only a single spring arm; and
    a component received in the recess,
    wherein the spring arm resiliently presses against the component so as to clamp the component in the recess so as to fix the component between the single spring arm and the at least one wall,
    wherein the recess has a shape which is configured to a contour of the component.

* * * * *